United States Patent [19]
Talcott

[11] Patent Number: 5,680,706
[45] Date of Patent: Oct. 28, 1997

[54] TRAILER HITCH ALIGNMENT DEVICE

[76] Inventor: Terry R. Talcott, 111 Guthrie St., Morehead City, N.C. 28557

[21] Appl. No.: 608,499

[22] Filed: Feb. 28, 1996

[51] Int. Cl.⁶ .................................................. B60D 1/40
[52] U.S. Cl. .................. 33/286; 33/264; 116/28 R; 280/477
[58] Field of Search .................. 33/286, 264; 116/28 R; 280/477

[56] References Cited

U.S. PATENT DOCUMENTS

| | | | |
|---|---|---|---|
| 2,927,310 | 3/1960 | Knapp | 116/28 R |
| 3,363,318 | 1/1968 | Folkins . | |
| 3,774,149 | 11/1973 | Bennett | 340/52 |
| 3,863,594 | 2/1975 | Gawthrop | 33/264 |
| 3,889,384 | 6/1975 | White | 33/264 |
| 3,901,536 | 8/1975 | Black | 280/477 |
| 3,918,746 | 11/1975 | Lehtisaari | 280/477 |
| 4,192,526 | 3/1980 | Myers | 280/477 |
| 4,583,481 | 4/1986 | Garrison | 116/28 R |
| 4,621,432 | 11/1986 | Law | 33/264 |
| 4,666,176 | 5/1987 | Sand | 280/477 |
| 4,687,220 | 8/1987 | Danielson | 33/264 |
| 4,708,359 | 11/1987 | Davenport | 280/477 |
| 4,741,111 | 5/1988 | Emerick | 33/264 |
| 4,905,376 | 3/1990 | Neeley | 33/264 |
| 4,958,436 | 9/1990 | Tusche | 33/264 |
| 5,035,441 | 7/1991 | Murray | 280/477 |
| 5,036,593 | 8/1991 | Collier | 33/264 |
| 5,180,182 | 1/1993 | Haworth | 280/477 |
| 5,290,056 | 3/1994 | Fath, IV | 280/477 |

OTHER PUBLICATIONS

Pending Patent Application of Robert W. Owens, Serial No. 08/556,632 filed 13 Nov. 1995 which is a continuation of serial No. 08/234,559, Robert K. Owens, filed 28 Apr. 1994.
Advertisement from *Cabela* catalog Spring 1994—HindSight trailer alignment system.
Super hitch guidance system—*Trailer Life* magazine Mar. 1994.

*Primary Examiner*—Christopher W. Fulton

[57] ABSTRACT

A device is provided for alignment of a trailer and a towing vehicle which consists of a visible mast placed on the trailer tongue to allow the towing vehicle driver to view the mast and to easily back into a correct position for coupling with the trailer. The mast has a pivotable arm which can be secured in either an extended contact position or a relaxed, downward position as necessary.

13 Claims, 5 Drawing Sheets

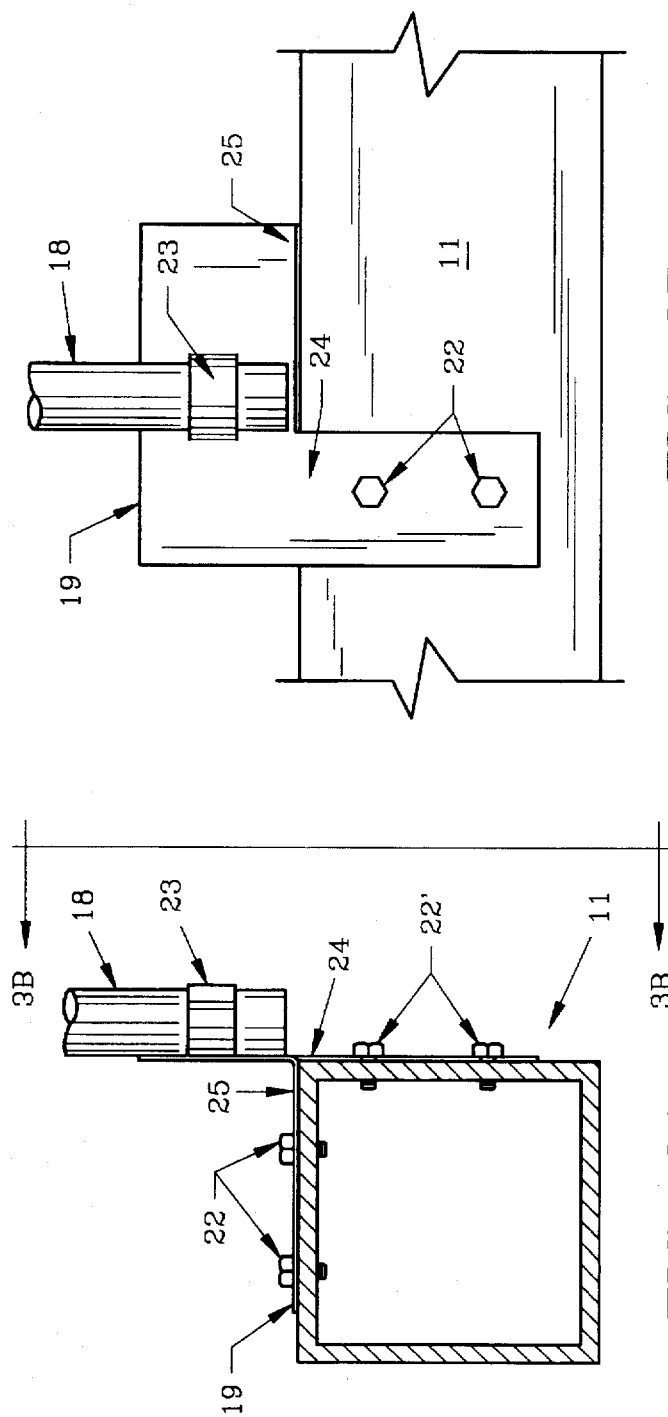
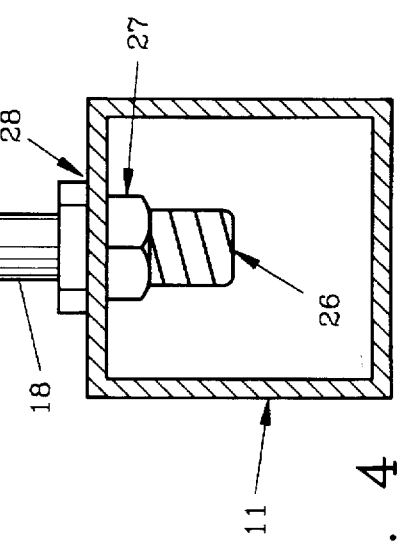
FIG. 3B
FIG. 3A
FIG. 4

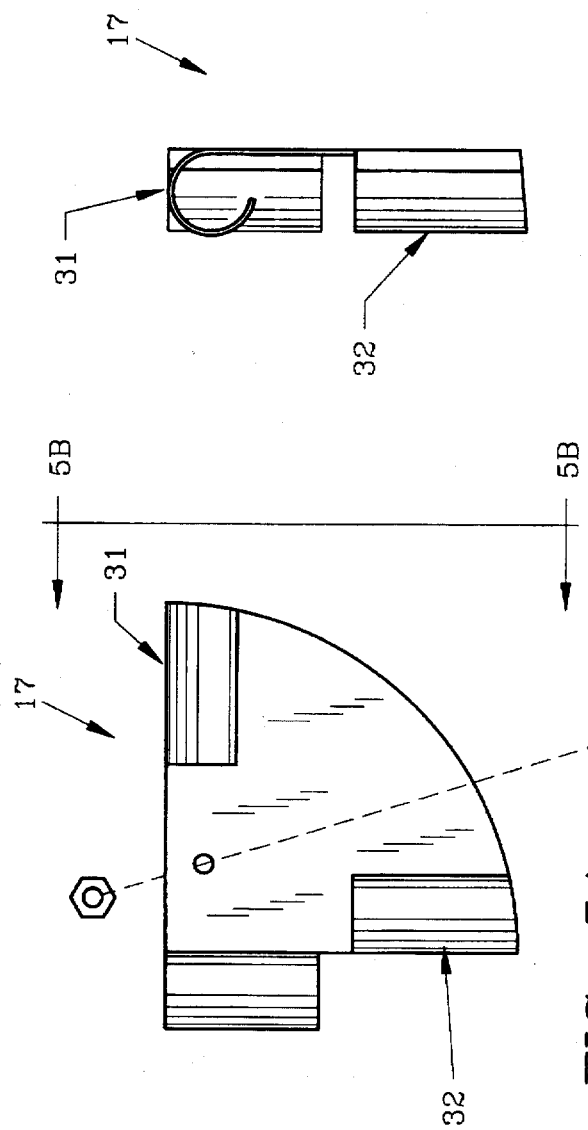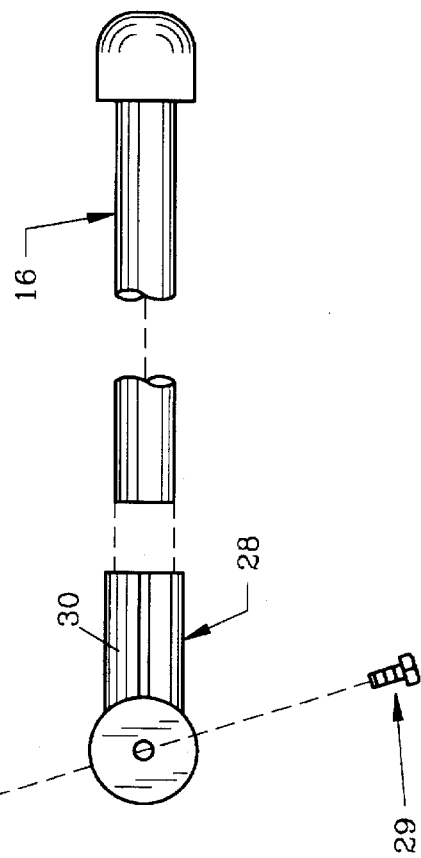
FIG. 5A
FIG. 5B

TRAILER HITCH ALIGNMENT DEVICE

BACKGROUND OF THE INVENTION

1. Field of the Invention

The invention herein pertains to alignment devices for trailers and particularly to alignment devices which include a vertical mast for assisting a vehicle driver in backing to align the vehicle with the trailer to facilitate coupling therewith.

2. Background and Objectives of the Invention

In recent years the recreational boating industry has witnessed an explosion of new enthusiasts and purchasers of relatively small fishing and sport boats used for water skiing, fishing and other activities. Most of the newer boats sold are purchased by those who tow their boats to lakes or beaches with a car, truck, van or other vehicle. As such towing is at best infrequent, learning to back a vehicle to couple it to the trailer can often be a frustrating and unpleasant experience. Various devices have been created in the past to assist in the backing and coupling process as shown in U.S. Pat. No. 4,741,111 which utilizes a rear window target strip and a trailer pointer. The pointer will contact the window target to designate the correct vehicle-trailer alignment. In U.S. Pat. No. 1,035,441, a vertical mast is provided which will move or pivot when the hitch components are correctly aligned. U.S. Pat. No. 4,958,436 illustrates a mast and flag which includes an L-shaped bracket. A plurality of masts are used to correctly align the towing vehicle with the trailer.

While such prior art devices as those listed above and others have attempted to make it more convenient to couple or hitch a trailer to a towing vehicle, various problems and difficulties remain in correctly aligning the hitch components. Thus, to overcome the disadvantages and limitations of current devices the present invention was conceived and one of its objectives is to provide a trailer hitch alignment device which is easy to install and learn to use.

It is another objective of the present invention to provide a trailer hitch alignment device which includes a mast with a pivotable contact arm which can be easily secured either in an extended, contact position or in a relaxed, downward position as desired.

It is another objective of the invention described herein to teach a method of aligning hitch components which is quick and efficient.

Still another objective of the present invention is to provide a hitch alignment device which includes a mast bracket for installation on a trailer tongue.

Various other objectives and advantages of the present invention will become apparent to those skilled in the art as a more detailed description is set forth below.

SUMMARY OF THE INVENTION

The aforesaid and other objectives are provided by a trailer alignment device which includes a vertical flexible mast affixable to a conventional trailer tongue. A pivotable arm is joined to the mast which can be extended or raised to contact the vehicle as it backs into alignment with the trailer. The mast is affixed at its lower end to a bracket which provides secure engagement with the trailer tongue by the use of fasteners such as bolts, screws or the like. At the upper end of the mast a flag or other easily viewable object is affixed. To couple the trailer to the vehicle for towing purposes, the vehicle is backed with the driver observing the mast flag through the rear window. A decal or other mast "sight" can be positioned on the rear window glass as is conventional in the art to help align the trailer and vehicle. Once the vehicle strikes the contact arm, the mast (which is formed from a flexible fiberglass composition or other suitable material) and flag bend backwardly, in clear view of the driver. At this point, the driver stops the towing vehicle and can easily engage the trailer hitch components of the vehicle and the trailer. The pivotable arm is then manually disengaged from its extended posture and is swung downwardly and engaged in a "relaxed" posture until further use is required.

BRIEF DESCRIPTION OF THE DRAWINGS

FIG. 3A depicts a cross-sectional end view of the mast attached on the trailer tongue as seen along lines 3A—3A in FIG. 1;

FIG. 3B demonstrates another view of the bracket as seen along lines 3B—3B of FIG. 3A;

FIG. 4 shows another method of joining the mast to a trailer tongue as shown in cross-sectional view;

FIG. 5A illustrates the mast plate as shown removed from the mast;

FIG. 5B demonstrates the mast plate as shown along lines 5B—5B of FIG. 5A; and

DETAILED DESCRIPTION OF THE PREFERRED EMBODIMENT OF THE INVENTION

Figure 1:
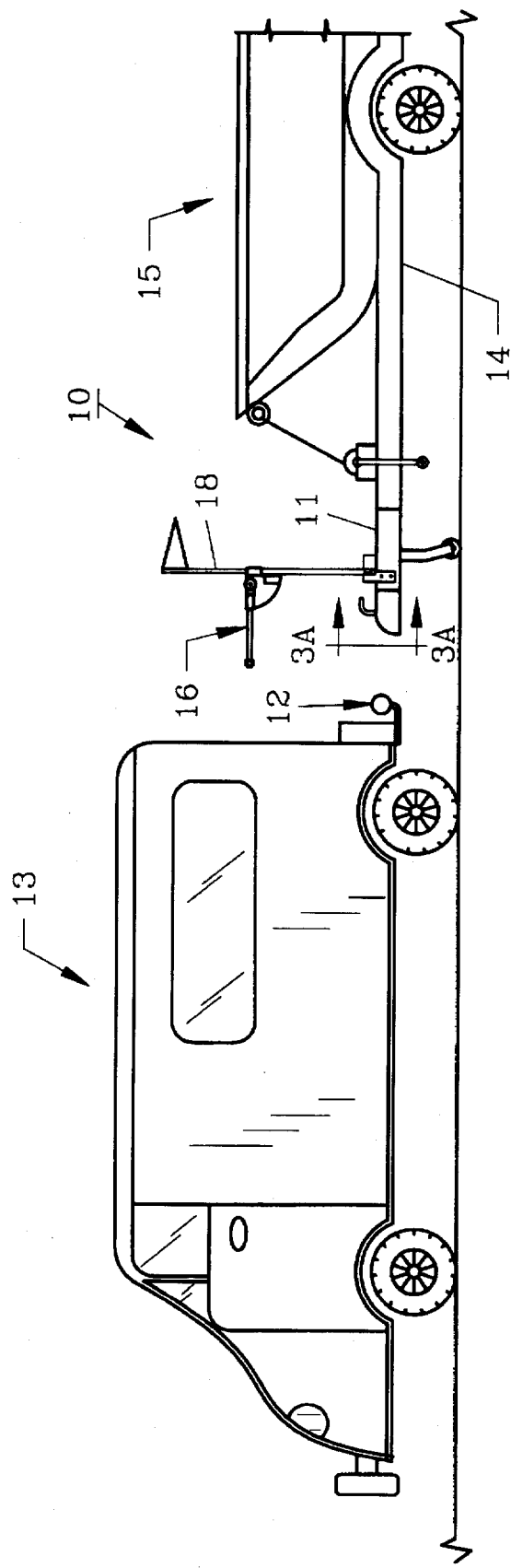
FIG. 1 shows a conventional towing vehicle backing to couple with a trailer having the invention mounted thereon.
Figure 2:
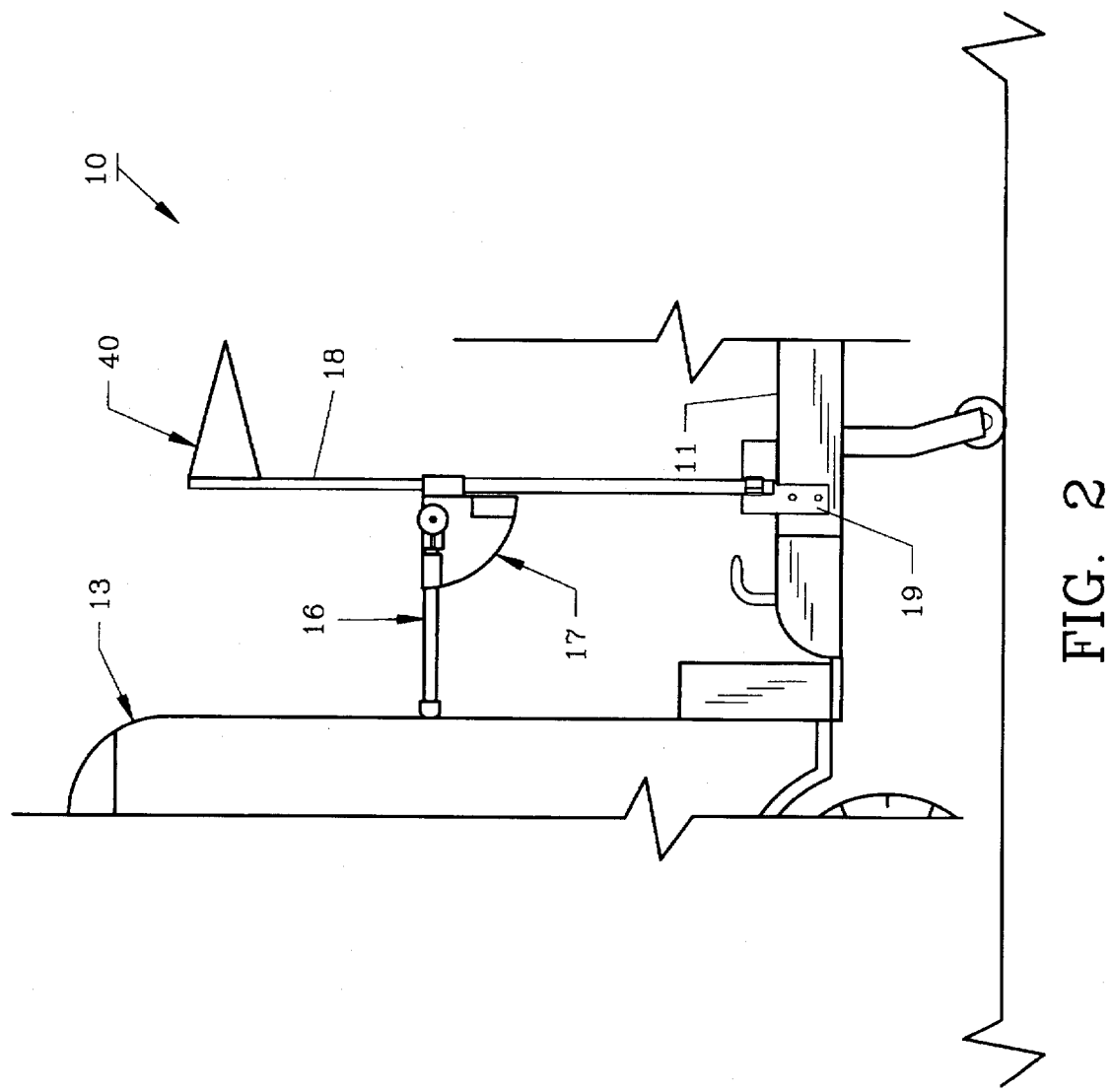
FIG. 2 illustrates a close-up view of the towing vehicle and trailer hitch as attached for coupling.

For a better understanding of the invention and its use, turning now to the drawings, FIG. 1 demonstrates trailer alignment device 10 mounted on a conventional trailer tongue 11 for coupling with trailer hitch ball 12 affixed to towing vehicle 13, consisting of a standard van. Other towing vehicles could likewise be employed such as automobiles, pickup trucks, or the like. Trailer tongue 11 is joined to trailer 14 for transporting fishing boat 15. Alignment device 10 could also be used on a variety of trailers, campers or other towed vehicles. An enlarged view of trailer alignment device 10 is seen in FIG. 2 with contact arm 16 extended. Contact arm 16 is joined to mast plate 17 which in turn is glued to mast 18 at approximately the midpoint therealong. As further shown in FIG. 2, bracket 19 is mounted on trailer tongue 11 and is affixed at the lower end of mast 18. The upper end of mast 18 supports flag 40 which allows the vehicle driver an easy view of the relative position during backing.

In FIG. 3A, the attachment of bracket 19 to trailer hitch 11 includes the use of bolts 22, 22'. Bracket 19 is likewise affixed to mast 18 by frictional engagement with strap 23 cut from bracket 19, which is usually formed from a thin gauge metal. In FIG. 3B bracket 19 is shown as having a vertical planar component 24 and in FIG. 3A horizontal planar component 25 which is perpendicular thereto and assists in stabilizing bracket 19 against trailer tongue 11. Other means could also be provided for affixing mast 18 to trailer tongue 11 and in FIG. 4, mast 18 is affixed to threaded sleeve 26 which passes through trailer tongue 11 and is tightened thereon by the use of nut 27. FIG. 4 demonstrates another manner of affixing mast 18 to tongue 11 by use of a threaded sleeve 26. Mast 18 slides into sleeve 26 which is then placed through aperture 28 in tongue 11 and secured by nut 27.

Mast plate 17 is shown enlarged in FIG. 5A with exploded arm sleeve 28 pivotally joined thereto by bolt 29. Contact arm 16 is urged into sleeve 30 where it remains by frictional engagement. Mast plate 17 includes a pair of selectable locking members 31 and 32 integrally formed therewith. Locking member 31 acts as a temporary sleeve and provides horizontal stability to contact arm 16 to "lock" contact arm 16 horizontally as needed. Locking member 32 allows contact arm 16 to be locked vertically when not in use. Locking members 31, 32 will slightly pivot as affixed to allow contact arm 16 to fit tightly therein but to be manually removable when desired. As would be understood, locking member 31 maintains contact arm 16 in a rigid horizontal position whereby mast 18 will bend or flex, allowing flag 40 to wave for easy viewing by the driver of van 13, when contact occurs.

Figure 6:
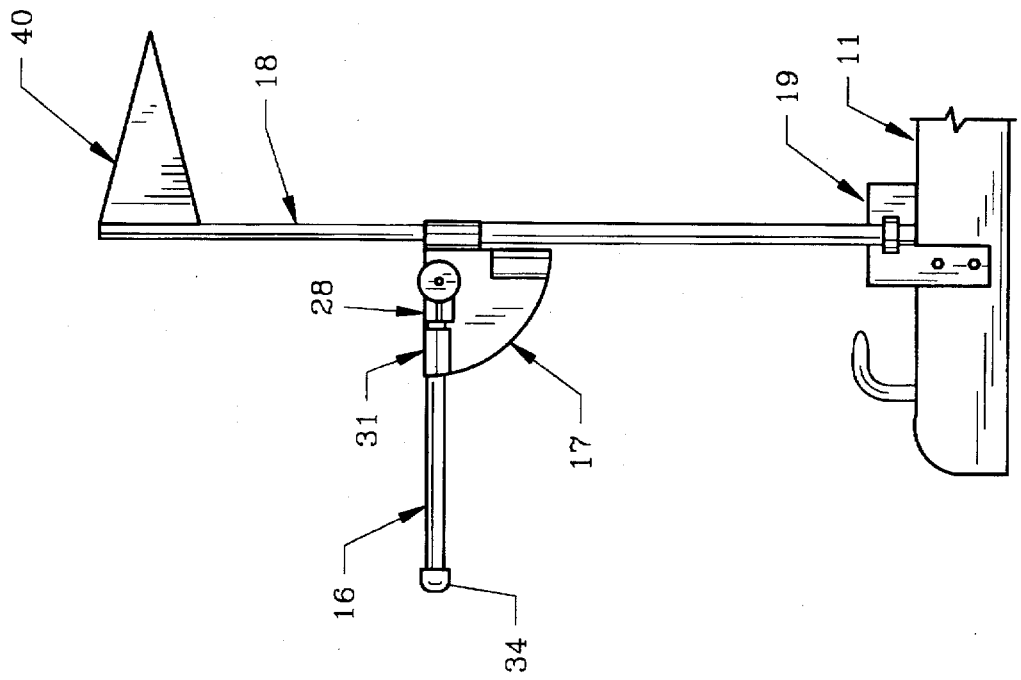
FIG. 6 pictures a view of the mast plate affixed to the mast with the pivotable arm locked in the contact or extended posture.

In FIG. 6, mast 18 is shown with flag 40 affixed thereto. Flag 40 may be formed from a flexible plastic material, fabric or the like. A sight ball may also be employed instead of flag 40 which may be formed in a bright color for easy observation by the towing vehicle driver when backing. Contact arm 16 may include a resilient rubber or plastic tip 34 to prevent damage to contact arm 16 and to the rear of van 13 as shown in FIG. 1. Bracket 19 is mounted on trailer tongue 11 so contact arm 16 touches van 13 when the hitch components of tongue 11 and van 13 are correctly aligned. In backing van 13, the contact with arm 16 causes flag 40 to wave, notifying the van driver when slowly backing to immediately stop.

Various changes and modifications can be made to the invention as described herein and the examples and illustrations are merely for explanatory purposes and for not intended to limit the scope of the appended claims.

I claim:

1. A trailer alignment device for attachment to a trailer comprising a mast, means to attach said mast to a trailer, said attaching means affixed to said mast, a pivotable contact arm, said contact arm affixed to said mast, locking means to releasably lock said pivotable contact arm, said locking means comprising means to lock said contact arm in a first extended posture and means to lock said contact arm in a second relaxed posture, said locking means joined to said mast.

2. The trailer alignment device of claim 1 wherein said attaching means comprises a bracket, said bracket comprising a vertical component, a horizontal component and said horizontal component attached to said vertical component.

3. The trailer alignment device of claim 2 wherein said vertical component and said horizontal component are planar.

4. The trailer alignment device of claim 1 further comprising a mast plate, said mast plate affixed to said mast, said pivotable contact arm joined to said mast plate.

5. The trailer alignment device of claim 4 wherein said locking means is attached to said mast plate.

6. The trailer alignment device of claim 1 further comprising a flag, said flag attached to said mast.

7. The trailer alignment device of claim 1 wherein said mast is bendable.

8. A trailer alignment device for attachment to a trailer to assist in coupling with a towing vehicle, the alignment device comprising: a mast, means to attach said mast to a trailer, said attaching means affixed to said mast, a mast plate, said plate positioned on said mast, said plate comprising a pair of locking members formed integrally with said plate, and a pivotable contact arm, said contact arm joined to said mast plate.

9. The trailer alignment device of claim 8 further comprising a contact arm sleeve, said sleeve affixed to said contact arm, and said sleeve rotatably joined to said mast plate.

10. The trailer alignment device of claim 8 wherein said attaching means comprising a vertical component and a horizontal component.

11. A trailer alignment device for attachment to a trailer, the device comprising:

(a) an elongated flexible mast;

(b) means for attaching one end of said mast to the trailer;

(c) a contact arm pivotally attached to said mast at the end opposite said attaching means, said contact arm for contacting a vehicle moving toward the trailer;

(d) means for locking said contact arm into an extended position perpendicular to said mast and in a relaxed position parallel to said mast, said locking means positioned on the end of said mast opposite said attaching means; and (e) a wavable flag positioned on said mast.

12. The device of claim 11 wherein said locking means comprises a mast plate and a pair of locking members integrally formed with said mast plate, said locking members for selectively receiving said contact arm.

13. The device of claim 12 wherein said locking members are oriented at an angle of 90 degrees relative to one another.

* * * * *